United States Patent [19]

Lyles

[11] Patent Number: 5,689,508
[45] Date of Patent: Nov. 18, 1997

US005689508A

[54] RESERVATION RING MECHANISM FOR PROVIDING FAIR QUEUED ACCESS IN A FAST PACKET SWITCH NETWORKS

[75] Inventor: Joseph B. Lyles, Mountain View, Calif.

[73] Assignee: Xerox Corporation, Stamford, Conn.

[21] Appl. No.: 576,099

[22] Filed: Dec. 21, 1995

[51] Int. Cl.[6] .............................. H04J 3/02; H04L 12/56
[52] U.S. Cl. ............................ 370/391; 370/418; 370/424
[58] Field of Search ..................................... 370/351, 389, 370/390, 391, 392, 393, 394, 395, 396, 397, 398, 399, 411, 412, 413, 414, 415, 416, 417, 418, 419, 422, 423, 424, 426, 427, 428, 429, 356, 355, 252, 253, 235, 236, 431, 442, 443, 462, 464, 465

[56] References Cited

U.S. PATENT DOCUMENTS

| | | | |
|---|---|---|---|
| 4,891,803 | 1/1990 | Huang et al. | 370/411 |
| 5,260,935 | 11/1993 | Turner | 370/418 |
| 5,402,417 | 3/1995 | Aramaki | 370/392 |
| 5,485,457 | 1/1996 | Aramaki | 370/427 |
| 5,519,698 | 5/1996 | Lyles et al. | 370/411 |

OTHER PUBLICATIONS

Zhang "Virtual Clock: A New Traffic Control Algorithm for Packet Switching Networks", GIGCOM '90, 1990, pp. 19–29.

*Primary Examiner*—Wellington Chin
*Assistant Examiner*—Huy D. Vu

[57] ABSTRACT

A non-blocking switching network for routing packets from a plurality of inputs to a plurality of outputs includes a reservation ring mechanism for resolving conflicts among inputs contending for access to specified ones of said outputs. This reservation ring performs a sequence of step and compare operations in top-to-bottom ring-like order during at least one arbitration cycle for granting contending inputs access to said specified outputs in a top-to-bottom order that is also consistent with the order required by self-clocked weighted fair queueing or, alternatively, virtual clock, with up to a maximum permissible plural number of contenders being given access to such an output on each of the arbitration cycles.

13 Claims, 8 Drawing Sheets

RESERVATION RING MECHANISM FOR PROVIDING FAIR QUEUED ACCESS IN A FAST PACKET SWITCH NETWORKS

FIELD OF THE INVENTION

This invention relates to high speed, broadband communication networks.

BACKGROUND OF THE INVENTION

Research projects and systems products now have have bandwidth, responsiveness, and/or real-time requirements that exceed the capabilities of existing computer networks. For example, the ongoing transition from paper to electronic formats for documents ranging from personal papers to technical libraries is leading to the development of advanced electronic scanning and printing devices, which have bandwidth requirements that will continue to increase, not only as the speed and resolution of these devices increase, but as the color and gray scale capabilities of these devices are extended. Another example of the demand for broader bandwidth networks on the high-quality video imagery that is envisioned by some of the emerging collaborative technologies, such as the Xerox Media Space, which utilize live video links and meeting-support systems that are based upon wall-sized display systems. Furthermore, high performance computers are becoming affordable for use as computing resources, high-performance file servers, visualization workstations, etc., but the networks that are now in use do not have the capacity that is needed to support these higher performance computers. Many applications can live with whatever bandwidth that they are given and can usefully utilize as much bandwidth as they can get. These applications have elastic bandwidth requirements. Most of the applications currently running on computer networks have elastic bandwidth requirements. The service class which supports these applications is known as "best effort" in the Internet community and Available Bit Rate (ABR) in the Broadband ISDN/ATM community. If bandwidth is not divided "fairly" between applications in this service class it is known that a variety of undesirable phenomena may occur.

Asynchronous Transfer Mode (ATM) switching is now becoming an accepted mechanism for providing sufficient peak and aggregate bandwidths to support the aforementioned applications as well as supporting multiple service classes. Many ATM switches are currently implemented with FIFO queuing. FIFO queuing exhibits pathological behaviors when used for ABR traffic (see "On Traffic Phase Effects in Packet-Switched Gateways", Sally Floyd and Van Jacobson, Internetworking: Research and Experience, Vol 3, pp 115–156 (1992), and "Observations on the Dynamics of a Congestion Control Algorithm: The effects of Two-Way Traffic", Lixia Zhang, Scott Shenker, and David Clark, ACM Sigcomm 91 Conference, Sep. 3–6, 1991, Zurich, Switzerland, pp 133–148.). FIFO is also unable to protect correctly behaving users against misbehaving users (it does not provide isolation). As a result of these deficiencies non-FIFO queuing mechanisms such as weighted fair queuing (see, for example, A. Demers, S. Keshave, and S. Shenker, "Analysis and Simulation of a Fair Queuing Algorithm," in Proceedings of ACM SigComm, pages 1–12, September 1989; and A. K. Parekh "A Generalized Processor Sharing Approach to Flow Control in Integrated Service Networks," Ph. D. thesis, Department of Electrical Engineering and Computer Science, MIT, 1992.) or approximations to fair queuing such as round-robin (Ellen L. Hahne, "Round-robin Scheduling for Max-Min Fairness in Data Networks," IEEE Journal on Selected Areas in Communications, vol 9, pp. 1024–1039, September 1991.) are often suggested.

There is another service class (or set of service classes): ones that support realtime applications such as circuit emulation and video. These applications may require that data be transmitted through the network with bounded jitter (or packet delay variation). As has been shown by the previously referenced paper by A. Parekh, weighted fair queuing can be used to provide bounded jitter for realtime streams. The Parekh results have recently (Pawan Goyal, Simon S. Lam and Harrick M. Vin, "Determining End-to-End Delay Bounds in Heterogeneous Networks," in Proceedings of The 5th International Workshop on Network and Operating System Support for Digital Audio and Video (NOSSDAV), Durham, N. H., Apr. 18–22, 1995.) been extended to prove delay bounds for systems using the closely related mechanisms of Virtual Clock (Lixia Zhang, "Virtual Clock: A New Traffic Control Algorithm for Packet Switching Networks," in Proceedings of ACM SigComm, pages 19–29, August 1990.) and Self-clocked Fair Queuing (S. J. Golestani, "A Self-Clocked Fair Queuing Scheme for High Speed Applications," In Proceedings of INFOCOM, pp 636–646, 1994).

Thus, both elastic (Best effort/ABR) and inelastic (or real-time) services can benefit from the use of fair queuing and related algorithms. However, such mechanisms must be implemented at each multiplexing point where queuing occurs.

Fair queuing and related algorithms operate on sequences of packets (an ATM cell is a packet for the purposes of this discussion). For ATM these sequences are identified by either the VCI or the VPI, while in the Internet protocol suite the identification is on the basis of <IP address, protocol, port> triples (IPv4) or flow identifiers (IPv6). In both self-clocked weighted fair queuing and virtual clock, packets are ordered (sorted) by timestamps (schemes such as round-robin provide approximations to ordering of packets by timestamps). These timestamps represent the virtual finishing time for the packet and are computed by taking a starting time value and adding an offset obtained by multiplying the length of the packet by a weight which represents the particular packet sequence's share of the bandwidth.

For virtual clock the virtual finishing time is computed as:

$$VT(f,0)=0$$

$$VT(f,j+1)=\max\{\text{Arrival}(f,j+1), VT(f,j)\}+\text{Length}(f,j+1)/\text{Rate}(f)$$

where VT(f, j) is the virtual finishing time associated with packet j of flow (virtual circuit) f, Arrival(f, j) is the arrival time of packet j of flow f, and Length(f,j) is the length of packet j of flow f.

Self-clocked weighted fair queuing assigns virtual finishing times according to the formula:

$$VT(f, 0)=0$$

$$VT(f,j+1)=\max\{\text{System VirtualTime}, VT(f,j)\}+\text{Length}(f,j+1)*\text{weight}(f)$$

where System VirtualTime is the defined to be the virtual time associate with the packet being served (being output) at the time packet(f,j+1) arrives.

For ATM the packet length is constant because the cells are of fixed size and thus the rightmost term in both expressions becomes a per flow constant. For virtual clock the simplified expression is:

$$VT(f,j+1)=\max\{Arrival(f,j+1),\ VT(f,j)\}+constant(f)$$

and selfoclocked weighted fair queuing has an analogous simplification. As a result, an ATM queuing point which implements either virtual clock or self-clocked weighted fair queuing must perform the following steps:

1) compute the maximum of the current virtual time for the VC and either of a) the arrival time of the cell or b) the system virtual time.

2) add to the results of step 1 a per-VC constant representing that VC's share of the bandwidth.

3) service cells (transmit them) in order of increasing values of the virtual time stamps assigned by steps 1 and 2.

SUMMARY OF THE INVENTION

In accordance with the present invention, a non-blocking switching network for routing packets from a plurality of inputs to a plurality of outputs includes a reservation ring mechanism for resolving conflicts among inputs contending for access to specified ones of said outputs. This reservation ring mechanism comprises means for performing a sequence of step and compare operations in top-to-bottom ring-like order during at least one arbitration cycle for granting contending inputs access to said specified outputs in a top-to-bottom order that is also consistent with the order required by self-clocked weighted fair queueing or, alternatively, virtual clock. Up to a predetermined maximum permissible plural number of contenders are given access to each output on each of the arbitration cycles.

BRIEF DESCRIPTION OF THE DRAWINGS

Additional features and advantages of this invention will become apparent when the following detailed description is read in conjunction with the attached drawings, in which.

DETAILED DESCRIPTION OF THE ILLUSTRATED EMBODIMENT

Figure 1:
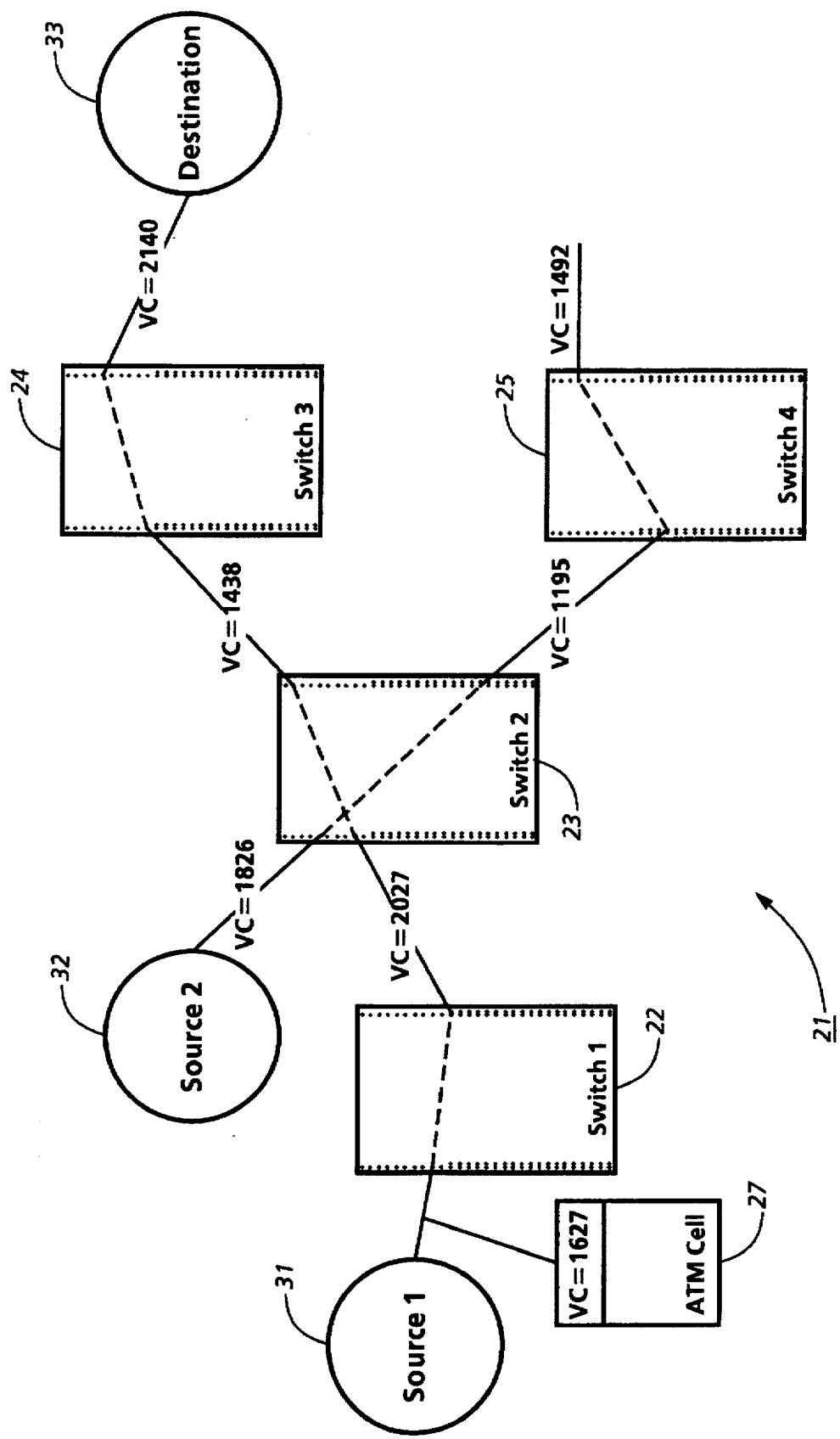
FIG. 1 schematically illustrates a hierarchical ATM network that is constructed in accordance with this invention.

While the invention is described in some detail hereinbelow with specific reference to an illustrated embodiment, it is to be understood that there is no intent to limit it to that embodiment. On the contrary, the aim is to cover all modifications, alternatives and equivalents falling within the spirit and scope of the invention as defined by the appended claims.

I. Definitions

As used herein, the following terms have the following meanings:

"Channel rate" is the bit rate of a particular stream, channel, etc.—for example, a single television transmission, a file transfer, a database transaction.

"Link rate" is the bit rate which a network device (host, router, switch) can or must sustain over an individual link (pair of wires, coaxial cable, optical fiber). This rate is an upper bound on the channel rate. It also has a major influence on the cost of interface hardware and of network protocol hardware and software.

"Aggregate rate" is the maximum total network capacity, expressed as a sum of the link rates for the maximum number of links that may be transmitting simultaneously. For networks implemented as buses or rings or using single-frequency wireless broadcasting, the link rate is identical to the aggregate rate. Conversely, conventional telephone switching systems provide aggregate rates much higher than the rate of any link.

II. The Basic Architecture

The ATM switch of the present invention can be implemented using a variety of switching fabrics, among them being a VLSI-based "Batcher/banyan" switching fabric of the type that has been developed by AT&T/Bellcore, a self-routing crossbar such as described in a copending and commonly assigned U.S. patent application of Lyles, which was filed Nov. 15, 1994 under Ser. No. 08/340,493 on "Self-Routing CrossBar Switch Suitable for Use as a Switching Fabric in an ATM Switch" (D/94466) or an off-the-shelf crossbar together with an additional logic unit such as is described in a copending and commonly assigned U.S. patent application of Lyles et al., which was filed May 23, 1995 under Ser. No. 08/447,673 on "Use of a Reservation Ring to Compute CrossBar Setup Parameters in an ATM Switch" (D94467). Accordingly, both of the aforementioned crossbar related applications are hereby incorporated by reference. In subsequent discussion the Batcher/banyan fabric will be assumed, but the discussion is valid for other non-blocking fabrics as well. As will be seen, this switch supports unicast and multicast virtual circuits operating at link rates of 155 Mbps, with provision for increasing link speed to 600 Mbps. In the implementation that is disclosed herein, each switch will support 32 ports, but it is believed that the Batcher/banyan switching technologies will scale to switches larger than 256 ports, and (in part because of the advances disclosed herein) link rates exceeding 1 gigabit/sec. Furthermore, these switches can be interconnected to form a larger, hierarchical network for supporting larger user communities.

One of the appeals of ATM switching is that substantial standardization has occurred. The basic concept for this type of network is that all communications are accomplished by the transmission and switching of small, fixed-sized data packets, called "cells". The overhead of each packet is reduced by using virtual circuit techniques, whereby the header of each cell identifies a path that has been set up in advance through all the switches between the source and the destination, so that the information required to identify the cell and its desired routing is much smaller than the header information in a conventional XNS or TCP/IP datagram. Persons interested in the status of the ATM standards making activity and the technical content thereof should refer to papers published on that subject by Study Groups 11 and 13 of the ITU-T (International Telecommunications Union—Telecommunications), by ANSI (American National Standards Institute) sub-committee T1S1 and by the ATM Forum.

In accordance with the ATM standard that has been developed, a cell is a small, fixed-size (53-byte) packet whose header includes destination addressing information, which is known as the destination virtual circuit index, VCI. There also is a virtual path index (VPI), but switching on virtual paths is essentially identical to switching on virtual circuits so that subject need not be further discussed herein. Before a cell enters the switching fabric, the source host causes a fixed route, known as a "virtual circuit," to be determined for transferring the cell from its source to its destination. Each switched link in this virtual circuit (each switch-to-switch link and each switch to destination link) is uniquely identified by a switch specific virtual circuit identifier (VCI). Thus, one virtual circuit has a number of names. Cells may not be reordered at any point along a virtual circuit, the cells must arrive in the order that they were sent.

Referring to FIG. 1 with the foregoing in mind, it will be seen that there is a hierarchical network 21 that comprises a plurality of self-routing, non-blocking switches 22–25 for transferring cells, such as the ATM cell 27, from one or more sources 31 and 32 to one or more destinations 33. For example, in the case of a LAN (Local Area Network), the sources 31 and 32 might be workstations, while the destination 33 might be a file server. As illustrated, the network 21 has two levels of hierarchy, but it will be evident that the hierarchy can be extended to provide packet transport and switching through much longer paths, including Metropolitan Area Networks (MANs) and even Wide Area Networks (WANs).

Figure 2:
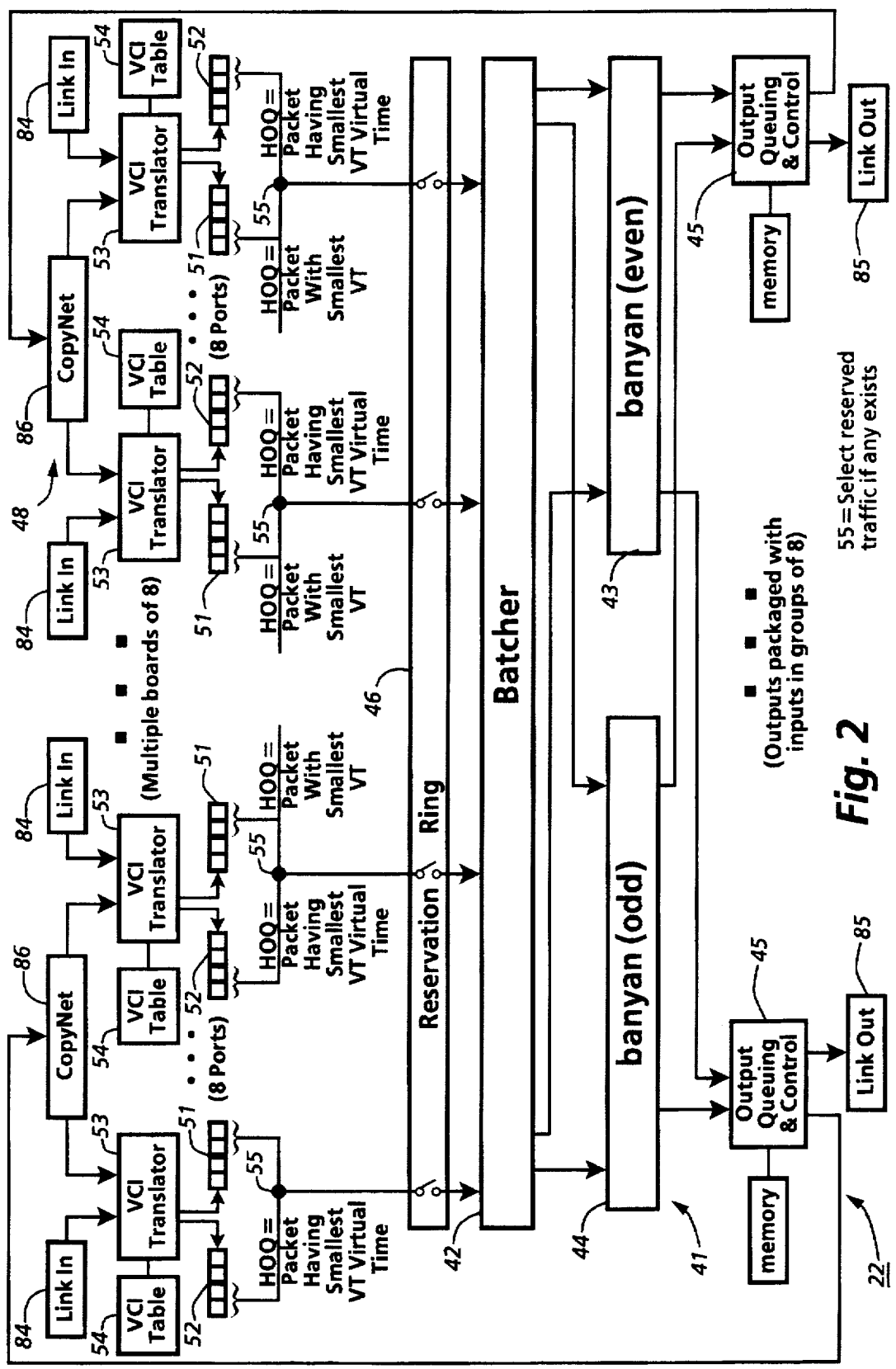
FIG. 2 schematically illustrates an ATM switch that is constructed in accordance with this invention.

Turning to FIG. 2, the switches 22–25 suitably are composed of respective Batcher/banyan networks 41. As illustrated for the switch 22, a single n port Batcher sorting network 42 feeds some number k (typically two or three) banyan routing switches 43 and 44 that are connected such that as many as k cells can be routed to the same output port number during the same cell switching cycle without losing any of those cells. To accommodate this parallelism, there is a relatively large (thousands of cell) buffer 45 for each output port, which is constructed to receive up to k cells per cycle from the output banyans 43 and 44. To handle both real-time traffic (Deterministic Bit Rate, or DBR, in the ITU-T terminology) and "best efforts" (Available Bit Rate, or ABR, in the ITU-T terminology) traffic, the buffer 45 advantageously is composed of two or more sub-buffers of differing size (not shown); including a small buffer of several hundred cells for rate-limited or reserved traffic, and a much larger buffer for unreserved traffic. Mathematical results produced by A. Parekh show that for a weighted fair queued switch, the maximum delay experienced by a VC, and thus the maximum buffer allocation that is needed for that VC's traffic, shaped to conform to a token bucket of depth b and a rate r, is a function of b and the service rate. The total buffer allocation at a switching node is then the sum of the buffer requirements for each of the VCs. Since the bucket size determines the Cell Delay Variation (CDV), and the DBR service class expects a small cell delay variation, then (for rates of interest) this implies that the buffer for DBR traffic should be relatively small (e.g., on the order of one or two cells for each active VC). For "bursty traffic", such as occurs in current data networks, which is not bounded by strict rate limits, the associated virtual circuits are queued in the larger buffer (best efforts/ABR traffic). The control loop for an ABR service needs at least one round trip's worth of buffering. Since the sum of the bandwidths assigned to the ABR VCs running over a single output port can never be greater than the link speed of the output port, the total buffering required is proportional to the link speed times a maximum round trip time. For service within the continental United States this is about 30 milliseconds and thus a 150 megabit/sec switch needs around ½ megabyte of buffering per output line. As is known, buffers of these sizes easily are built from SRAMs. Higher speeds and longer round trip times are easily accommodated by using advanced DRAM technology, such as Synchronous DRAM (SDRAM), or increasing the parallelism of the data path into the buffer memory.

As will be appreciated, if more than k cells were to be routed to the same output port number during a single switch cycle, the switch would fail to perform as expected, rather than simply dropping the excess cells. This situation must, therefore, be avoided. To that end, in keeping with accepted practices, a reservation ring 46 is provided for fairly adjudicating the contention among such conflicting cells, while permitting at most k of them to be presented to the switch in any cycle. As described in more detail hereinbelow, this reservation ring 46 is composed of a set of circuits, one for each port, that are wired through all the ports to form a systolic array.

Connected to the input side of the switching fabric 41 and the reservation ring 46 there suitably is an n×n copy network 48, which can be constructed using either off-the-shelf or custom crossbar switch components. All cells are specifically marked as point-to-point or multicast cells by the state of a multicast bit in their switch headers. As will be seen, switch headers are prepended to the ATM cells for routing those cells through the switching fabric 41 and for entering them into the appropriate output queue at 45. In the illustrated embodiment, incoming multicast cells are routed the switching fabric 41 just like unicast cells, but then are intercepted at the output of the switching fabric and returned to the copy network 48, rather than being routed to outgoing lines.

There is also a memory 50 at each of the input ports of the switch 41 for buffering incoming cells and cells supplied by the copy network 48, respectively. This memory is divided into two buffers 51 and 52 which hold the cells that have arrived at the input port until they can be routed through the switch 41 without contention (if desired, one or both of these buffers may be subdivided into sub-buffers to support multiple priority classes). If desired, the buffer memory 50 may be combined with the VCI translator lookup table 54 to gain a more compact implementation.

The routing of the cells through the switching network 41 is controlled by the VCI translators 53 at the input ports to the switch. These translators 53 use VCI table lookup memories 54, which are maintained and updated by a host processor (not shown), for computing a three-valued function of the input port address and the destination virtual circuit index (VCI) that is carried by the header of the cell at the head of the queue for the associated input port, i.e., [VCI, outputPORT, multicastFlag]←Routing Function [i, VCI]. As will be appreciated, interfaces to a conventional microprocessor or the like (not shown) are required to control the switch 22, primarily by loading the various routing and mapping tables into its VCI lookup tables 54.

III. A More Detailed Description of the Components of the Switch

A. The Virtual Circuit Translators

Figure 3A:
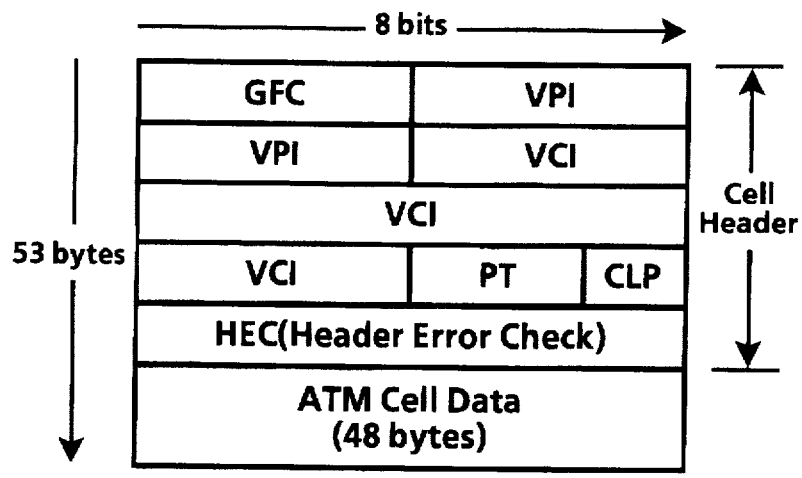
FIG. 3A illustrates the usual format of an ATM cell.
Figure 3B:
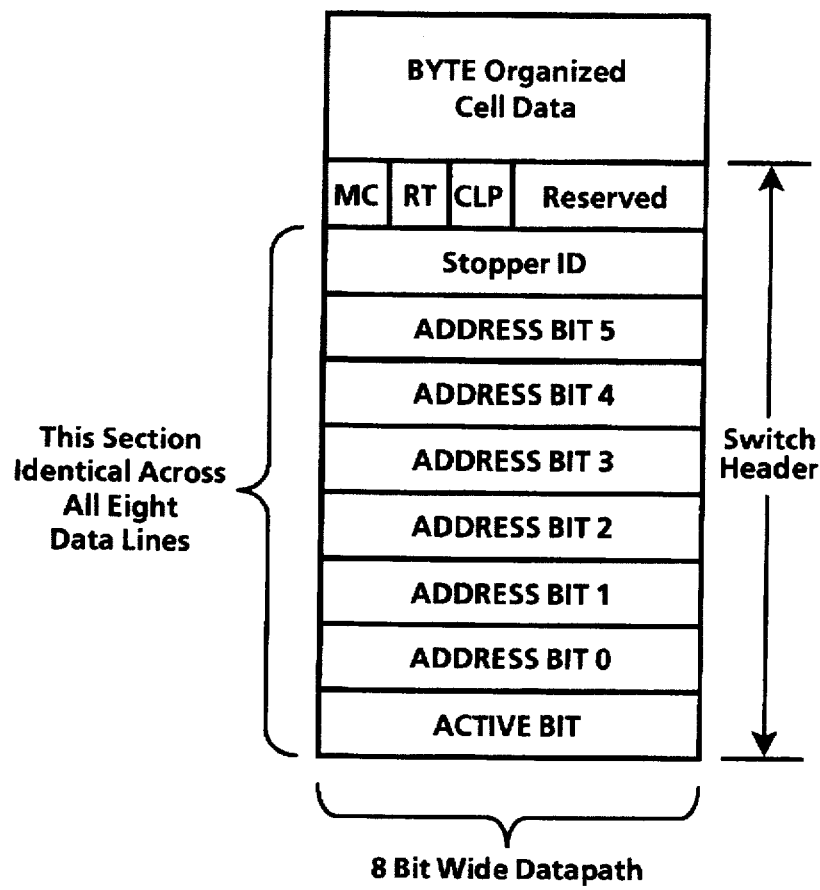
FIG. 3B illustrates a typical switch header for an ATM cell.

The translators 53 that are provided for performing the address-mapping at the input ports of the switching fabric 41 have several functions, including: selecting (based on the destination VCI/VPI address contained in the header of the ATM cell at the head of the input queue), the output port from the fabric 41 that is on the route to the desired destination; rewriting the incoming VCI/VPI address to the appropriate value for the outgoing link (as will be recalled, VCI/VP's do not have end-to-end significance); and managing the specialized mapping that is required for multicast transmissions, as described in greater detail below. These translators 53 may also maintain a count of the number of ATM cells switched per virtual circuit, such as for billing and load monitoring purposes. FIG. 3A illustrates the format of a typical ATM cell, and FIG. 3B illustrates the format of a typical switch header for such a cell. It is to be noted that the global flow control (GFC) field in the cell header usually contains a NULL value (the GFC field contains non-zero values only when the switch implements a controlled interface as specified in ITU-T Recommendations I.361 and I.150, Jul. 1995, at the associated input/output port).

B. The Batcher/banyan Network

A switching network is said to be "non-blocking" if, in any switching cycle, it is capable of generating an arbitrary permutation, or a partial permutation, of its inputs. In other words, a non-blocking switch is able to generate all possible one-to-one input/output mappings in a single switching cycle.

Switching networks typically are composed of cascaded networks of simple switches, or stages. A route through such a network is a path traversing switch stages from a given input to a given output. A switching network is classified as "self-routing" if, for each stage in the net, the routing can be determined with only the information contained in the cells entering that stage of the switch; that is, with locally available information.

Figure 4:
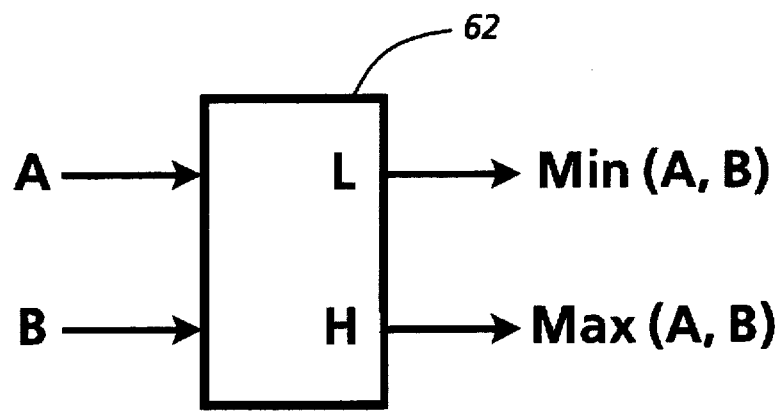
FIG. 4 schematically illustrates a Batcher sorting element.
Figure 5:
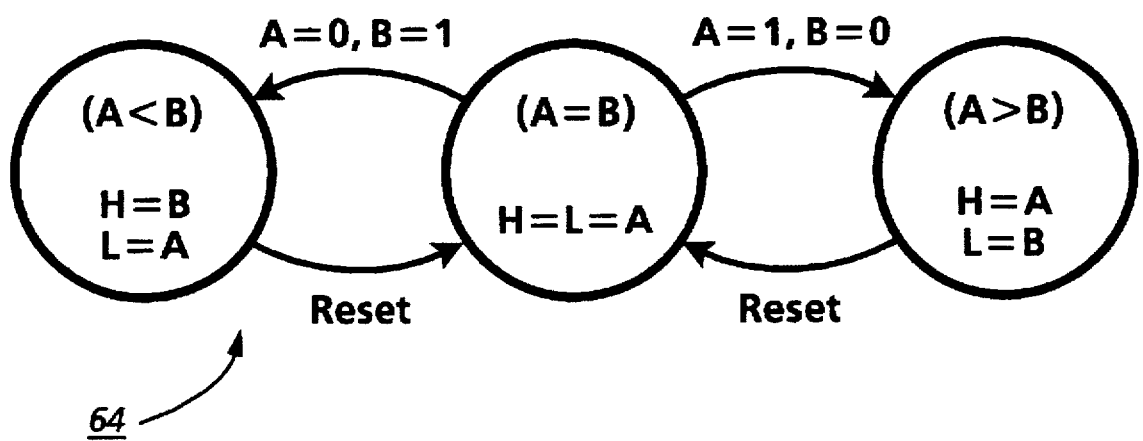
FIG. 5 is a finite state machine that illustrates the operation of a Batcher sorting element.
Figure 6:
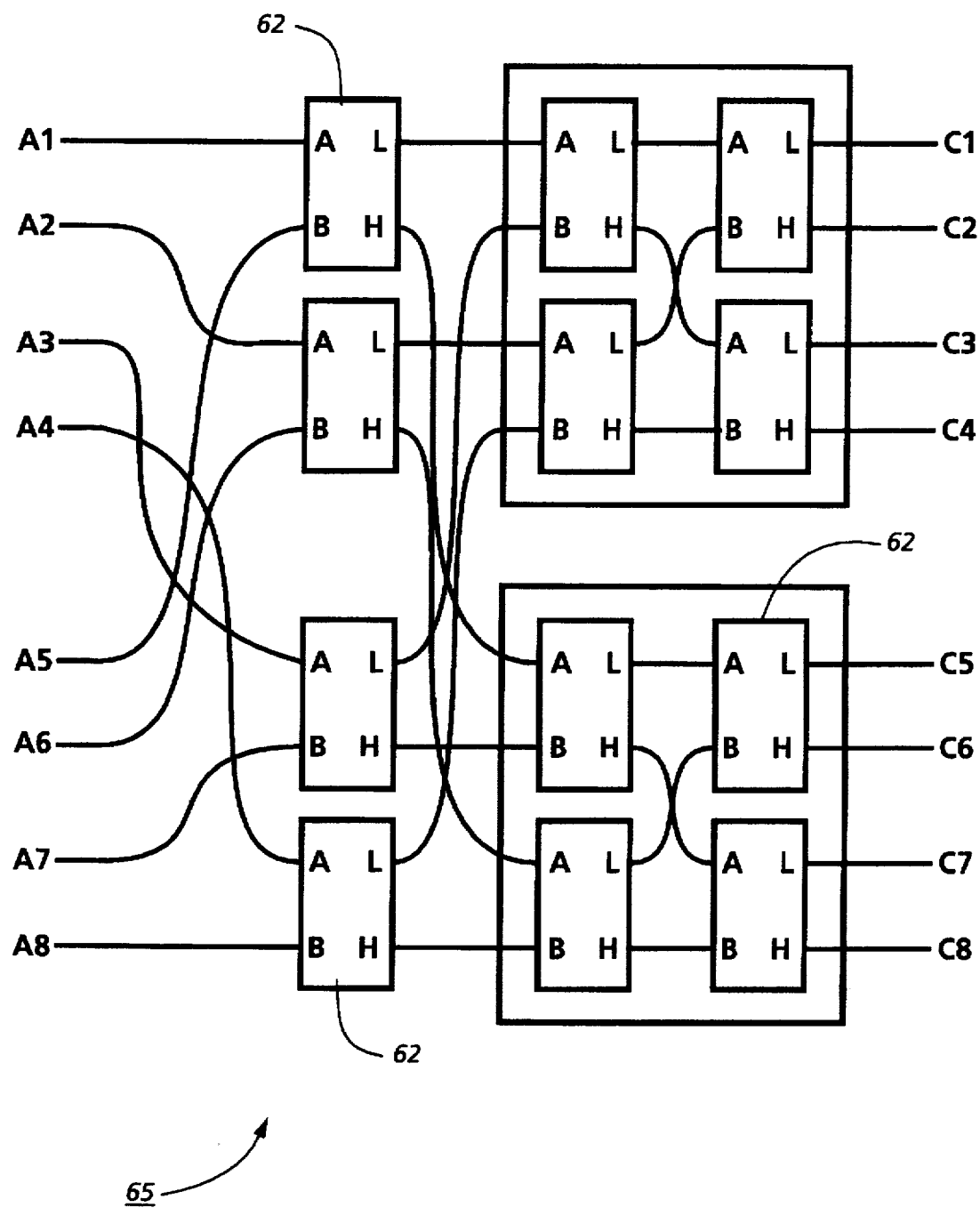
FIG. 6 schematically illustrates a Batcher sorting network that is composed of a recursive combination of sorting elements of the type shown in FIG. 4.

A Batcher/banyan network is a known example of a non-blocking, self-routing switching fabric. As is known, a Batcher network is a parallel sorting network that typically sorts N data streams with a network of depth $(\log_2 N)^2$, which means that $N(\log_2 N)^2$ sorting elements are required. As shown in FIG. 4, each sorting element 62 accepts two inputs ("A" and "B") and computes both the minimum and the maximum thereof, thereby sorting the inputs. Thus, when the inputs are in the form of two bit serial data streams with the most significant bit first, then the sorting element function as a very simple finite state machine, as at 64 in FIG. 5. These sorting elements 62 conventionally are recursively combined (see FIG. 6) to build sorters 65 for four, eight, and more inputs.

Figure 7:
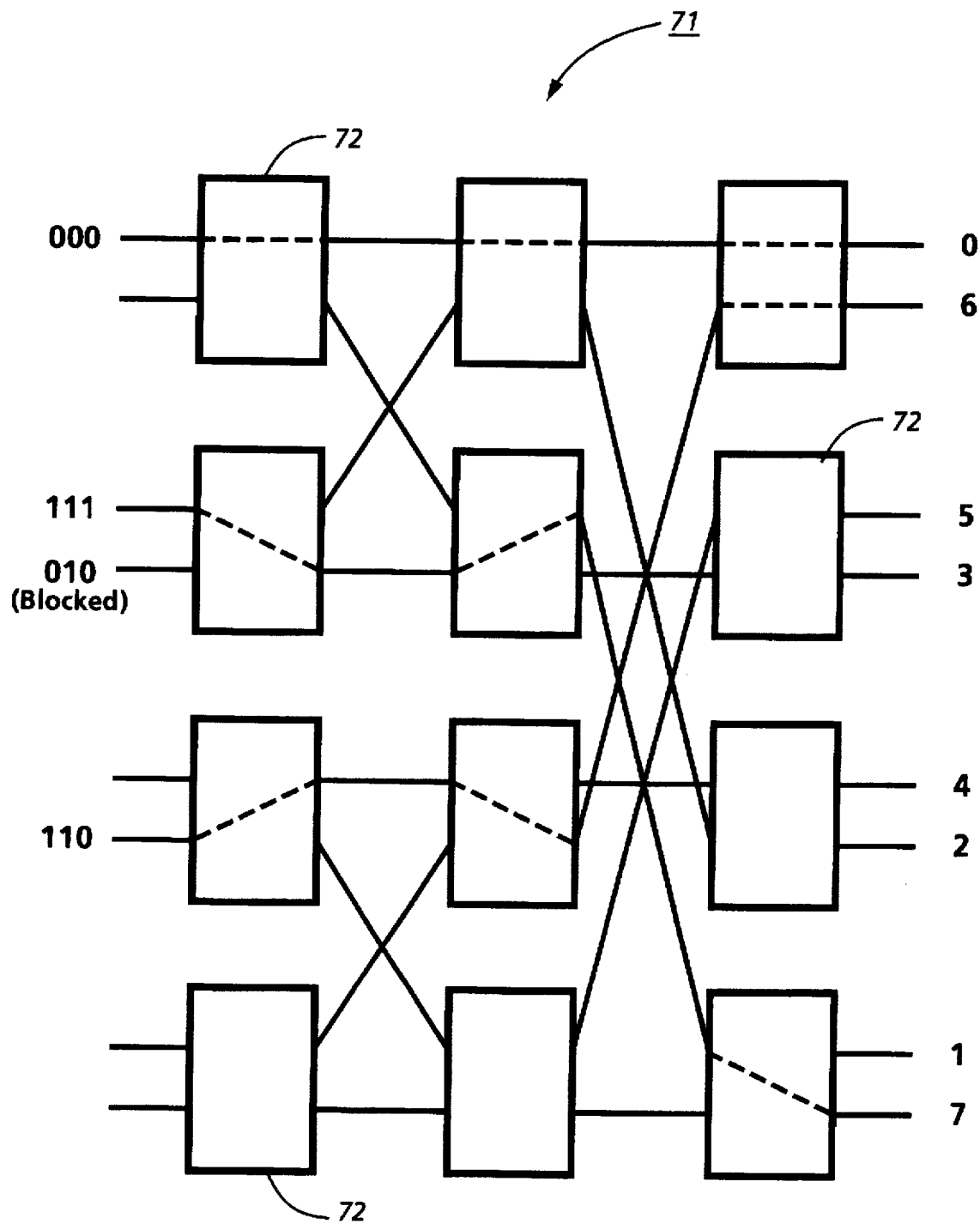
FIG. 7 schematically illustrates a banyan routing network.

As shown in FIG. 7, a standard banyan routing network 65 is a multi-stage network of depth $\log_2 N$, where N is the number of inputs to the network. As with the Batcher sorting network 65, the banyan routing network 71 is recursively composed of primitive switching elements 72; each of which has two inputs and two outputs. Thus there are O(NlogN) primitive switching elements 72 in the banyan network 71. When a data sequence streams through the banyan network 71, a primitive element 72 at each stage of the network 71 examines one bit of the output address and routes that bit and all subsequent bits in that particular sequence to one or the other of its outputs, depending on the value of the bit. In keeping with standard practices, the address bit changes for each stage, whereby the first stage routes based on the value of the highest order bit, the second stage on the value of the second highest order address bit, and the Nth stage on the value of the lowest order bit. After N address bits have been processed, the remainder of the sequence follows the path that has been established to the switch output. This means that the end of one sequence and the beginning of the next must be determined by external factors. Thus, it should be recalled that in this instance each sequence is a fixed-size ATM cell plus its fixed size switch header.

At any stage of the banyan network 71, it is possible for both inputs to select the same output. If that occurs, the banyan network "blocks," so it produces indeterminate results. In other words, the banyan network 71 cannot compute an arbitrary permutation of its inputs, but there are classes of permutations for which it is "non-blocking." One of these classes is the one in which the inputs are ordered by their output addresses. For that reason, as illustrated in FIG. 2, the Batcher sorting network 42 precedes the banyan routing networks 43 and 44, thereby providing a switching fabric 41 that is non-blocking and self-routing.

Advantageously, as shown in FIG. 2, multiple banyans 43 and 44 (typically, two or three) are used to reduce output contention. For example, in the illustrated embodiment, there are two banyan switching networks 43 and 44 following the Batcher sorting network 42 to provide a speed-up factor of k=2. Each of the banyans 43 and 44 uses only 1/k of its inputs, so the other inputs are tied off. The outputs of the Batcher 42, in turn, are connected to the inputs of banyans 43 and 44 so that every k-th output of the Batcher 42 is connected to the k-th input of the banyan 43 or the banyan 44 (as shown, this means that the banyans 43 and 44 route the odd and even numbered outputs of the Batcher 42, respectively). Consequently, up to k distinct cells addressed to the same output port can appear at k contiguous outputs of the Batcher 42 and then can be routed to the desired output port of the switching fabric 41 through k distinct banyans 43 and 44.

C. The Reservation Ring

The reservation ring 46 (FIG. 2) is the arbiter that resolves output contention while implementing "fair" access to the output ports of the switching fabric 41, when the number of cells destined for a single output port exceeds "k". There are many different definitions of "fairness," but an arbiter that admits cells to the switching fabric in the order specified by self-clocked weighted fair queuing is preferred for traffic classes supporting elastic services and either self-clocked weighted fair queuing or virtual clock is preferred for traffic classes supporting real-time services.

More particularly, in keeping with the teachings of a published paper of Arturo Cisneros, "Large Packet Switch and Contention Resolution Device," *Proc. XII International Switching Symposium*, Stockholm, Sweden, May/June, 1990, V3, pp. 77–83 (which is hereby incorporated by reference), and Cisneros U.S. Pat. No. 5,130,984, the reservation ring 46 is implemented as a linear systolic array 75 (FIG. 8) of finite state machines 76a–76n, which are connected to each other in a ring-like configuration. Each of these finite state machines, which are sometimes referred to hereinbelow as "evaluators," communicate with respective ones of the input ports of the switching fabric 41. As will be seen, this reservation ring suitably causes all cells or "packets" with the same explicit priority and that are found to be destined to the same output destination during any given arbitration session to form a closed set against subsequent arrivals until all of the cells that are participating in the given session have been routed to their common output destination. This ensures that each arbitration session for each output destination is brought to an orderly conclusion before another session is initiated for that same destination. Among the advantages of using a linear systolic array, such as the array 75, are that all communications are local and electrical loads do not grow with array size. This enables linear scaling of the system. Bingham et al. U.S. Pat. No. 4,761,780 which issued Aug. 2, 1988 on "Enhanced Efficiency Batcher-Banyan Packet Switch" provides an even more fundamental description of a reservation ring, so it also hereby is incorporated by reference.

It has been found that the Cisneros reservation ring can be modified to provide for the servicing of cells in order of time stamp values (the step 3 of the self-clocked weighted fair queuing or virtual clock algorithms as enumerated above) when performing contention resolution for switching fabrics, such as the switch 41, having multiple routing networks 43 and 44 (i.e., networks having a speed-up factor, $k \geq 2$). In other words, the reservation ring 46 resolves any contention that exists during each arbitration cycle (i.e., without requiring any variable to propagate more than once around the reservation ring 46). Thus, just one arbitration cycle is required for each switch cycle. It, therefore, follows that it is not necessary to time-stagger the operation of the routing networks 43 or 44 or to initiate the arbitration process more than one arbitration cycle in advance of the switching. Instead, the arbitration and switching processes can be synchronized straightforwardly by triggering a switching cycle and another arbitration cycle at the conclusion of each arbitration cycle.

In keeping with accepted practices, each of the finite state machines (FSMs) 76a—76n functions as an evaluator for determining whether the packet appearing at the head of the input queue (the HOQ packet) for a respective one of the input ports of the switching fabric 41 is addressed to the same output port (e.g., by output port number) as the HOQ packet any of the other input ports. To this end, each of the evaluators 76a—76n includes a pair of address registers $RA_x$ and $SA_x$ (where x is the associated input port number). Each of these registers $RA_x$ and $SA_x$ are initialized at the outset of each arbitration cycle to store the output port address of the HOQ packet (if any) for the associated input port. If the queue for any of the input ports happens to be empty at the outset of an arbitration cycle, the state logic for the evaluator at that port sets the bit position, $T_x$, for that port in a one bit wide contention vector to a TRUE ("1") state. Additionally, if a rigorous "in session" restriction is to be imposed on the arbitration process to prevent packets that arrive after the beginning of an arbitration session from joining the on-going session, an $InSession_x$ flag bit may be reset to a FALSE ("0") state whenever the queue for the input port$_x$ is empty at the outset of an arbitration cycle.

The requested address RA that is loaded into the register $RA_x$ is a local variable. However, the copy, SA, of that address that is loaded into the register $SA_x$ is a propagating variable. Specifically, the addresses SA are shifted around the reservation ring 46 in top-to-bottom closed loop order under the control of a controller 78 for comparison in each of the other evaluators with the local requested address variable that is stored therein. Similarly, the $InSession_x$ flag is a local variable that indicates whether the associated input port is a potential participant in an arbitration session. On, the other hand, the contention vector value T propagates downwardly through the evaluators to discriminate for each of the evaluators (other than the uppermost evaluator 76a) between contenders of equal priority that are located at input ports that are located above or below the port being serviced by the evaluator in question, as well as to identify input ports that are not participating in the current arbitration session.

In keeping with Cisneros' previously referenced teachings, it is possible to add multiple levels of packet priority to the evaluation process. To this end, each of the evaluators 76a—76n includes a pair of address registers $RP_x$ and $SP_x$ (where x is the associated input port number). Each of these registers $RP_x$ and $SP_x$ are initialized at the outset of each arbitration cycle to store the priority (if any) of the HOQ packet for the associated input port. The highest priority can either be assigned to the minimum value of the priority register or to the maximum value; which value represents the highest priority (i.e. is given first access to the output) is a function of whether the priority comparisons described hereinbelow use "less than or equal" or "greater than or equal" as the comparison operation.

Up to k packets, but no more than k packets, can be switched to any given output port of the switching fabric 41 during any one switching cycle. Consequently, whenever an evaluator loses an arbitration, fairness requires that the affected packet be given priority over packets that have not yet been subject to the arbitration process. For this reason, each of the evaluators 76a—76n sets a contention flag bit $FC_x$ and a pending contention flag bit $F_x$ to TRUE ("1") states whenever it loses an arbitration. The TRUE ("1") state of the contention pending flag bit $F_x$ signals the input port associated with the unsuccessful evaluator to hold the affected packet at the head of its input queue so that the on-going arbitration session can be extended for one or more additional switching cycles. On the other hand, the contention flag bit $FC_x$ is copied into a one bit register RC for a local contention flag RC and into a one bit register $SC_x$ for a propagating contention flag SC. An evaluator participates in an arbitration session only if the local contention flag RC and the propagating contention flag SC therein are in agreement at the time the decision to participate or not is made. The flags RC and SC work in conjunction with RP and SP to give all contenders for any given output port access to that output in prioritized, top-to-bottom, round-robin order during the course of one or more switching cycles.

In keeping with the previous work that is described in U.S. Ser. No. 08/104,458 (D/92155I), each of the evaluators 76a—76n includes an integer counter $CNTR_x$ that counts through a range of k−1 from a predetermined starting value. This counter is cleared to its starting value (e.g., 0) at the outset of each arbitration cycle and then is incremented whenever its host evaluator determines that the packet at its input port is contending with a packet at a higher input port. If the an evaluator receives a shifted address SA that equals its local address variable RA, and the value of its local priority variable RP is less than or equal (greater than or equal) to the shifted priority SP, the evaluator checks the state of its then current contention vector bit T and the state of its pending contention flag, F. If the evaluator has a TRUE ("1") contention vector bit T and its pending contention flag F is still FALSE ("0"), the evaluator concludes that it has won the arbitration. Accordingly, at the conclusion of the arbitration cycle, the evaluator returns a TRUE ("1") grant, plus the count accumulated by its $CNTR_x$ (a so-called "port counter" value), to its input buffer, thereby releasing the cell at the head of the input queue for that port for switching to the designated output port. On the other hand, if evaluator finds that its $CNTR_x$ has overflowed in the presence of a FALSE ("0") contention vector bit value, its concludes that it has last the arbitration round, so it sets its contention flag bit $FC_x$ and its pending contention flag bit $F_x$ to TRUE ("1") states to extend the on-going arbitration session as described above.

The foregoing can be more precisely summarized in pseudo-code as follows:

Constants:
    $T_{-1}$ = 1(where $T_{-1}$ is the T input to stage 0)
Local Variables per port evaluator:
    RA : INT[0 . . . NumPorts−1];
    RP: INT[0 . . . NumPriorityLevels−1];
    RC: BOOL;

```
FC, F: BOOL; (F = 1 => arbitration is lost)
InSession: BOOL;
Cntr: INT[0 ... k-1];
Shifted Variables per port evaluator:
    SA: INT[0 ... NumPorts-1];
    SP: INT[0 ... NumPriorityLevels-1];
    SC: BOOL;
    T: BOOL; (T = 0 => port is above)
System Reset:
    RA←SA←0;
    RC←SP←RP←SC←FC←F←T←InSession←0;
    Cntr←0;
InitForArbitration:
    1) If packet is newly presented for arbitration, then FC←0;
    2) RA←SA←RequestedPort; SP←RP←Requested Priority;
       RC←SC←FC;
       F←T←0;
       InSession←1;
       Cntr←0;
    3) if this port not active this cycle then [T←1; InSession←0]
ArbitrationStep:
    ifInSession = 1 AND (RA = SA) then
    {
    CASE:
        - - There is another port with a higher priority level
            SP > RP: Cntr++; on overflow of Cntr, F←FC←1;
        - - There is another port above this one in the reservation ring
            that has a the same priority and wants the same output
            (SC = RC) AND (SP = RP) AND (T = 0): Cntr++;
            on overflow of Cntr, F←FC←1;
        - - The apparent contender is on a port beneath this one in the
            reservation ring, or an inactive port, and has the same priority
            (SC = RC) AND (SP = RP) AND (T = 1): NULL;
        - - The apparent contender has a lower priority, ignore it
            SP < RP: NULL
        - - The apparent contender is not part of this arbitration session
            (RC = 1) AND (SC = 0) AND (SP = RP): NULL;
            This port is not a valid participant in this arbitration session.
        GET OUT!
            (RC = 0) AND (SC = 1) AND (SP = RP):
                {F←1; FC←0; InSession←0;};
    ENDCASE;
    };
Finalization:
    FC←InSession & F;
    Sendpacket(Grant = 1) if[F = 0 & InSession = 1].
```

If desired, the InSession restrictions of the foregoing reservation ring mechanism 46 may be relaxed to permit any valid arbitration request to participate in an arbitration session, regardless of whether it is strictly within the current session or not. The advantage of this more relaxed approach is that it reduces the number of empty switch cycles, thereby increasing the throughput of the switch. The pseudo-code description of this relaxed version is as follows:

```
Constants:
    T_-1 = 1
Local Variables per port evaluator:
    RA : INT[0 ... NumPorts-1];
    RP: INT[0 ... NumPriorityLevels-1];
    RC: BOOL;
    SP: INT[0 ... NumPriorityLevels-1];
    FC, F: BOOL; (F = 1 => arbitration is lost)
    InSession: BOOL;
    Cntr: INT[0 ... k-1];
    Active: BOOL
Shifted Variables per port evaluator:
    SA: INT[0 ... NumPorts-1];
    SP INT[0 ... NumPriorityLevels-1];
    SC: BOOL;
    T: BOOL; (T = 0 => port is above)
System Reset:
    RA←SA←0;
    RC←SC←FC←F←T←InSession←0;
    Cntr←0;
    Active←0;
InitForArbitration:
    1)If packet is newly presented for arbitration, then [FC←0;Active←1;]
    2)RA←SA←RequestedPort;
      SP←RP←RequestedPriority;
      RC←SC←FC;
      F←T←0;
      InSession←1;
      Cntr←0;
    3)if this port not active this cycle, then T←1;
ArbitrationStep:
    if(RA = SA)then
    {
        CASE:
        - - There is another port with a higher priority level
            SP > RP: Cntr++; on overflow of Cntr, F←FC←1;
        - - There is another port above this one in the reservation ring that has
            a the same priority and wants the same output
            (SC = RC) AND (SP = RP) AND (T = 0): Cntr++;
            on overflow of Cntr, F←FC←1;
        - - The apparent contender is on a port beneath this one in the
            reservation ring, or an inactive port, and has the same priority
            (SC = RC) AND (SP = RP) AND (T = 1):NULL;
        - - The apparent contender has a lower priority, ignore it
            SP < RP: NULL
        The apparent contender is not part of this arbitration session
```

```
        (RC = 1) AND (SC = 0) AND (SP = RP): NULL;
        - - This port is not a participant in this arbitration session. Check if
        there are more than k valid participants in this session
        (RC = 0) AND (SC = 1) AND (SP = RP):
            {InSession←0;Cntr++; on overflow of Cntr, F←1};
ENDCASE;
FC←InSession & F  (Note, F has been set to "1" if the sum of(a) the # of
                   participants in the session, plus (b) the # of input
                   ports that are not part of the session but that are
                   requesting the arbitrated output port and are
                   above the evaluator, is greater than k).
};
Finalization:
    Send packet (Grant = 1) on port Cntr if F = 0 and Active = 1;
    Once Grant has been sent Active←0.
```

E. Input and Output Buffering—Queuing Strategy

The switching fabric 41 uses distributed queuing—i.e. one or more dedicated queues for each input and output line—rather than sharing queuing resources amongst all input and output lines. As is known, shared queuing is useful for dynamic reallocation of buffer space across all lines; an approach which tends to use buffer memory more efficiently at the expense of increased implementational complexity when fairness guarantees and bandwidth reservations are required. In this case, however, design simplicity is more important than optimizing the buffer utilization, so provision is made for isolating the input and output lines from each other, while imposing a fair service discipline on the switch. Consequently, if several inputs transmit to any single output at a rate that substantially exceeds the ability of the output to carry the traffic, cells will be lost by the switch at either the buffers for those input lines or at the buffer for that particular output. Fairness must be considered at both the input and output queuing points.

The network 21 (FIG. 1) suitably employs a straightforward token bucket mechanism for checking that guaranteed traffic (traffic from the Deterministic Bit Rate or Statistical Bit Rate ATM transfer capabilities—see Recommendation I.371) does not exceed the rate specified by the connection's traffic contract. Specifically, the network interface hardware/ software (not shown) of the computers that are serviced by the network limit the rate of guaranteed traffic to that specified by the traffic contract. In keeping with standard practices, a field in the VCI table differentiates among different classes of traffic. In the illustrated embodiment, a resTraf bit in the VCI table (which is copied to the switch header) is used to denote guaranteed traffic streams that have made resource reservations in advance. Thus, for each input port of each of the switches 22–25 there are at least two input queues, one for the guaranteed traffic and the other for non-guaranteed traffic. If the guaranteed traffic obeys the traffic contract, is serviced in the order specified by either self-clock weighted fair queuing or virtual clock, and is given priority over the non-guaranteed traffic, then the results of Parekh and those of Goyal, et. al. provide strong bounds on Cell Delay Variation (CDV, also referred to as jitter).

For non-guaranteed traffic (traffic from Available Bit Rate ATM transfer capabilities—see Recommendation I.371) the switch suitably employs self-clocked weighted fair queuing to schedule traffic. Non-guaranteed traffic employs a closed loop control (congestion avoidance control loop) where feedback from the network is used to control the rate at which sources send. It is known that when switches schedule cells in the order prescribed by self-clocked weighted fair queuing, then properties such as network stability can be proven. A method for testing conformance of non-guaranteed traffic to the feedback given the end-system (i.e., the workstation) by the network is not currently part of I.371 but is currently under study by the working group responsible for that Recommendation.

At the output queue all information needed to select the next cell is available locally. However, in keeping with this invention, at the input queuing point contenders are spread across multiple evaluation units. In order to implement the steps of self-clocked weighted fair queuing each evaluation unit needs to know the system virtual time associated with the requested output port and input evaluation units requesting the same output must be serviced in order of the virtual times associated with the packets at the head of their associated input queues. Likewise for virtual clock, while the virtual clock algorithm's calculation of virtual time relies only on data which is local to the evaluation unit, packets from multiple evaluation units must be serviced in order of their virtual times if those packets are destined to the same output.

It has been found that a reservation ring with priority can provide the functionality needed to both communicate the system virtual times needed for self-clock weighted fair queuing and prioritize the evaluation units on the basis of the virtual times of the packets at the head of each evaluation unit's associated queues. The key realization is that when the number of priority bits becomes large enough, then there is little difference between a priority and a time-stamp. If each evaluator puts the virtual finishing time for the packet at the head of its queue into the priority field, then the priority augmented reservation ring will select the k packets with the lowest virtual finishing time. This step is equivalent to the sorting step in both Virtual Clock and in Self-clocked Weighted Fair Queuing. Since all evaluators see all requests during the arbitration process, every evaluator can easily discover the system virtual time (=the largest virtual time granted access to the output in the previous cycle) associated with any specific output, thus enabling the other component of Self-clocked Weighted Fair Queuing.

Given that the number of priority bits is finite, mapping of timestamps onto priorities must comprehend the timestamp becoming larger than the number of available priorities. Given that the range of possible timestamps (smallest to the largest) is finite, the well-known technique used for wrap-around for sequence numbers in the TCP data communications protocol (see, for example, Douglas Comer's book "Internetworking with TCP/IP," vol. 2, pp. 172–173) works well. In particular, if a and b are two priority values for which the possible values differ by no more than one half the largest possible priority value, then two's complement arithmetic gives the correct answer. That is:

| result of a–b | relationship in sequence space |
| --- | --- |
| – | a precedes b |
| 0 | a equals b |
| + | a follows b |

We can ensure that the possible values differ by no more than one half the largest possible priority by making the priority space twice the largest difference, i.e. one bit larger.

Then, for each output port, there are two times of interest: $t_{earliest}$ and $t_{latest}$, where $t_{earliest}$ is the time of the next packet to be serviced and $t_{latest}$ the time associated with the last packet which will be serviced. The difference between $t_{earliest}$ and $t_{latest}$ cannot be greater than one-half $2^b$, where b is the number of bits of priority. This can be ensured by viewing the time as being kept modulo $2^b$, and then ensuring that no offset (the packet length times either rate or weight in virtual clock or weighted fair queuing respectively) is greater than $2^{b-1}$. For an ATM link running at OC-3 speeds (149.76 mbps—the SONET payload rate) there are approximately 353208 cells/sec on the link. If 64 Kbps (voice telephony rates) circuits (approximately 174 cells/sec when AAL type 1 is used) are the lowest speed that needs to be supported, then the ratio of the highest to the lowest rates supported is 2029, or eleven bits. This ratio is the maximum offset that will get added during the calculation of virtual times. Thus a twelve bit priority field is sufficient to encode the virtual times associated with circuits ranging in rates from 64 Kbps to full line rate.

For an input/output queued switch the input queues see an equivalent line rate that is multiplied by the speedup factor, k. Typically the number of cells queued at the input is much smaller than that queued at the output thus resulting in a lower waiting time at the input queue. We describe an approximate solution to the sorting step which will require fewer priority bits but which will still yield bounded results for jitter in the worst case. It is well known (c.f. either A. V. Aho, J. E. Hopcroft, and J. D. Ullman, The Design and Analysis of Computer Algorithms, Addison Wesley Publishing Company, third printing 1976, pp 77–78, or D. E. Knuth, The Art of Computer Programing: Vol 3, Sorting and Searching, Addison-Wesley Publishing Company, 1973, pp 170–178) that collections of items can be sorted by dividing them into buckets based on a subset of the key space. For a complete sort this dividing process needs to be carried out recursively on the buckets. In this form the sorting process is known as a radix sort. It is also well known that if records are no needed completely sorted, then the recursive radix sort can be terminated before completion leaving buckets containing items of nearly identical values but not in sorted order. As a general rule, approximate ordering of the virtual packet scheduling times is sufficient to satisfy conventional class of service guarantees.

The range of time stamps that needs to be supported can be further restricted by noticing that the calculation of virtual scheduling time need only be done for the first cell or packet currently queued for any given VC in the input queue. This reasons this is so are as follows: For Virtual clock the virtual scheduling time is a function of the connection virtual time (from the VCI translation table) and the arrival time if there are no cells for this VC already queued. If there are cells queued then only the virtual scheduling time of the cell immediately preceding the cell in question is of interest. Unless the link is oversubscribed (not possible for reserved traffic) then virtual time must be equal to or greater than real time. Likewise, for weighted fair queuing, when multiple cells are queued for a single VC then, since the system virtual time is set to the virtual time of the cell currently being transmitted, then the virtual scheduling time for a cell must be greater than or equal to the arrival time. Thus, it suffices to keep only the virtual scheduling time of the oldest cell of any VC currently queued at the queuing point. This result is well known and was first proposed by S. Keshav (see for example, Keshav, Srinivasan, "On the Efficient Implementation of Fair Queuing", Internetworking, Research and Experience, Vol 2, Number 3, September 1991, pp 157–173.)

For self-clocked weighted fair queuing, each input port must maintain the system virtual time associated with each output. Fortunately, however, the largest priority that has been granted access to given output is an acceptable approximation of the system virtual time that is associated with that output. (this priority is an estimate of that virtual time due to the bucket sort, i.e. multiple times are mapped into one bucket). Accordingly, each input port maintains an array indexed by output port number in which the maximum priority value, as determined by the comparison described in the above pseudo code, for winning ports is kept. Thus, this priority value is used both for determining the mapping of virtual time to priority value and for deriving the system virtual time for the self-clocked fair queuing algorithm.

For Virtual Clock the connection virtual time depends only on the cell arrival time and the previous virtual scheduling time. We compute the connection's virtual time as described above by comparing the cell arrival time (which is local to the interface) and the previous virtual scheduling time (stored as part of the per VC information) and adding the constant value determined by the VC's allocated rate. The priority value is then computed by taking the virtual scheduling time div $2^{(the\ radix)}$ and adding the largest priority previously granted access to the associated output.

For self-clocked fair queuing the system virtual time is required to compute the connection's virtual scheduling time. We use the largest priority previously granted access to the associated output times $2^{(the\ radix)}$ as the estimate of the system virtual time for that output port. Given a per VC virtual scheduling time for the previous cell on this connection, stored as part of the per VC information, the rest of the arbitration process proceeds as described above.

The above functions require that provision be made for inserting and removing cells to and from the input queue on a per VC basis. Persons of ordinary skill will understand how to maintain per VC linked lists of cells, each list having a head of list which is the next cell to be processed and a tail which will be linked to the next cell received on this VC (i.e., new cells for routing on the VC are appended to the linked list).

Alternatively, for the purposes of an input/output queued switch it may be overkill to keep a full linked-list structure. This is true for two reasons: firstly we only need one cell (the earliest virtual scheduling time) which is the head of one per VC list, secondly the size of the input queue is likely to be small. An alternative approach to keeping a full linked-list is to approximate the result by separating the input queue into two regions: a front of the queue into which cells can be loaded and stored for random access, and a rear section which operates as a FIFO queue. The bounded front region is then scanned each cell time, giving a linear time scan for the cell with the smallest virtual scheduling time; the size of the bounded front region being chosen such that there are sufficient clock cycles in a cell time to scan the entire region. The addition of a sequence number to each cell and the inclusion of said sequence number in the comparison is sufficient to keep cells of a virtual circuit in order. Persons of ordinary skill will understand how to implement such an algorithm.

In order to give higher priority to reserved traffic we have a priority field of log(NumberofPriorityClasses) bits which is independent of the virtual time. The extra field is used to extend the previously described priority-based reservation ring in a multikey sort. The method will be familiar to those ordinarily skilled in the art. For the case where there are two priority classes supported this field is one bit and will be called SRB, and RRB.

In order to calculate the system virtual time for outputs, each input must monitor the reservation ring to find the $k^{th}$ smallest priority for a given output (if there were as many as k requests for that output). We can implement this as a set of the k smallest values which may be updated at each arbitration step:

SmallestPriorities: ARRAY [0 ... NumPorts-1,0 ... k-1 ] of INT;

UpdatedThisCycle: ARRAY [0 ... NumPorts-1, 0 ... k-1] of BOOL;—cleared to—FALSE at the start of each arbitration cycle (initialization for arbitration)

At each arbitration step call to the procedure:

ComputeKthSmallestPriority(SA, SP);

in order to update the arrays SmallestPriorities and UpdatedThisCycle. If Self-clocked Weighted Fair Queuing is going to be used for both reserved and unreserved traffic, then the koth smallest priority would have to be computed for both reserved and unreserved traffic classes. However, we will use Virtual Clock for the reserved traffic class and avoid the necessity of computing the reserved k-th smallest priority.

For the example of k=2 an example implementation of the procedure ComputeKthSmallestPriority is:

ComputeKthSmallestPriority: PROCEDURE (SA: INT [0 ... NumPorts-1], SP: INT[0 ... NumPriorityLevels-1]);

{if NOT UpdatedThisCycle[SA, 0] then {SmallestPriorities[SA, 0]←SP; UpdatedThisCycle [SA, 0]←TRUE;} else if NOT UpdatedThisCycle[SA, 1] then {SmallestPriorities[SA, 1]←SP; UpdatedThisCycle [SA, 1]←TRUE;)

else if SP<SmallestPriorities[SA, 0] then SmallestPriorities[SA, 0]←SP else if SP<SmallestPriorities[SA, 1] then SmallestPriorities[SA, 1]<←SP; };—end of example implementation of ComputeKthSmallestPriority SystemVirtualTime for an output, j, is then given by:
max (SmallestPriorities[j, 0], SmallestPriorities[j, 1 ])

The reservation ring algorithm executed at each evaluation unit is then:

---

Constants:
$T_{-1} = 1$;
Define ResTraff = 1; - - highest priority traffic class
Define UnResTraff = 0;
Define NumTrafficClasses = 2; - - for this example we support reserved and unreserved only.
Local Variables per port evaluator:
SmallestPriorities: ARRAY[0 ... NumPorts-1, ... 0 k-1] of INT;
UpdatedThisCycle: ARRAY[0 ... NumPorts-1, 0 k-1] of BOOL;
RA: INT[0 ... NumPorts-1];
RP: INT[0 ... NumPriorityLeyels-1];
RC: BOOL;

RRB: INT[0 ... NumTrafficClasses-1];
FC, F: BOOL; (F = 1 => arbitration is lost)
InSession: BOOL;
Cntr: INT[0 ... k-1];
Active: BOOL
Shifted Variables per port evaluator:
SA: INT[0 ... NumPorts-1];
SP: INT[0 ... NumPriorityLevels-1];
SC: BOOL;
SRB: INT[0 ... NumTrafficClasses-1];
T: BOOL; (T = 0 => port is above)
System Reset:
RA←SA←0;
RC←SC←FC←F←T←InSession←0;
Cntr←0;
Active←0;
SmallestPriorities[*, *]←0;

---

InitForArbitration

If a cell is present on the reserved queue chose the cell with the lowest virtual scheduling time and remove it from the reserved queue else if a cell is present on the unreserved queue chose the cell with the lowest virtual scheduling time and remove it from the unreserved queue. Virtual scheduling times for the reserved queue may be calculated in accordance with the Virtual Clock algorithm. In the algorithm below Virtual Clock is assumed for reserved traffic so as to avoid the necessity of maintaining a SystemVirtualTime for each output. Virtual scheduling times for the unreserved queue should be calculated in accordance with Self-Clocked Weighted Fair Queuing and a SystemVirtualTime for unreserved traffic per output must be computed.

---

1)If packet is newly presented for arbitration, then [FC←0;Active←1;]
2)RA←SA←RequestedPort;
SP←RP←RequestedPriority; - - derived from the virtual time
RC←SC←FC;
F←T←0;
InSession←1;
Cntr←0;
UpdatedThisCycle[*, *]←FALSE;
3)if this port not active this cycle, then T←1;
4)SRB←RRB←if cell is reserved traffic then ResTraff else UnResTraff;
ArbitrationStep:
if NOT SRB then ComputeKthSmallestPriority(SA, SP);
if(RA = SA) then
{
  CASE:
    - - There is another port either in a higher priority traffic class or with a smaller priority.
    (SRB > RRB) OR (SP < RP): {Cntr++; on overflow of Cntr, F←1;}
    - - There is another port that is part of our arbitration session, that has the same priority, belongs to the same traffic class, and that is above this port in the reservation ring.
    (SC = RC) AND (SP = RP) AND (RRB = SRB) AND (T = 0);
        {Cntr++; on overflow of Cntr, F←1;}
    - - The apparent contender is part of our arbitration session on a port at a lower level in the switching fabric, or an inactive port, and is in the same traffic class and at the same priority as us.
    (SC = RC) AND (T = 1) AND (SP = RP) AND (SRB = RRB): NULL;
    - - The apparent contender is in a lower priority traffic class or has a higher priority than us.
    (SRB<RRB) OR (SP>RP): NULL;
        - - The apparent contender is not part of this arbitration session
    (RC = 1) AND (SC = 0) AND (SP = RP) AND (SRB = RRB): NULL;
        - - This port is not a participant in this arbitration session. Check if there are more than k valid -continued

```
            participants in this session
    (RC = 0) AND (SC = 1) AND (SP = RP) AND
    (SRB = RRB):
            {InSession←0;Cntr++; on overflow of Cntr,
                    F←1 };
    ENDCASE;
    FC←InSession & F (Note, F has been set to "1" if the sum of
    (a) the # of participants in the session, plus (b) the # of input ports
    that are not part of the session but that are requesting the arbitrated
    output port and are above the evaluator, is greater than k).
    };
Finalization:
    Send packet (Grant = 1) on port Cntr if F = 0 and Active = 1;
    Once Grant has been sent Active←0.
```

Figure 8:
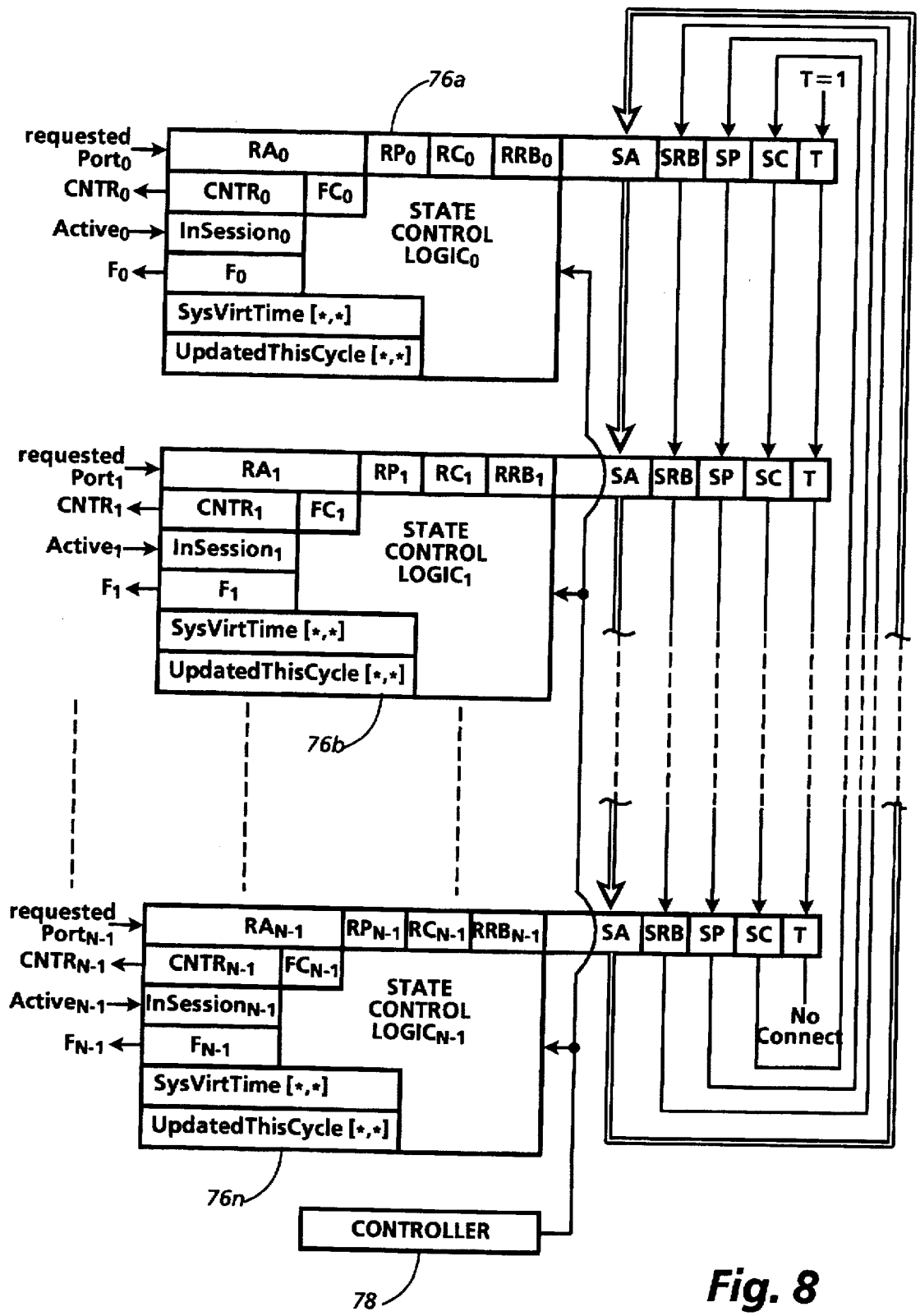
FIG. 8 is a simplified schematic illustration of a reservation ring that is suitable for carrying out this invention.

FIG. 8 schematically illustrates the arbitration that is performed by a reservation ring of the type shown at 46 for a self-routing, non-blocking switching fabric having two routing networks (k=2), such as the fabric 41 with its two banyan networks 43 and 44 as shown in FIG. 2. In this simplified example, the switching fabric routes packets from four input ports, $InPort_0$–$InPort_3$, to designated ones of four output ports, $OutPort_0$–$OutPort_3$, on the basis of the output port addresses or designations that are contained by the packet headers. The reservation ring arbitrates all of the input ports of the switching fabric during each arbitration cycle to resolve any contention that occurs among packets that are addressed to the same output port. Multi-cycle arbitration sessions may be required to fully resolve the contention, but the contention is resolved in favor of k contending packets during each arbitration cycle, except for the last cycle of an arbitration session when the contention is resolved in favor of up to k of the contending packets (i.e., the remaining contenders). Thus, the reservation ring releases arbitrated packets into the switching fabric at the conclusion of each arbitration cycle, so each arbitration cycle is followed immediately by a switching cycle.

More particularly, an arbitration session may be initiated with the HOQ packets for $InPort_0$, $InPort_1$, and $InPort_3$ being addressed to $OutPort_3$ and with the HOQ packet for $InPort_0$ being addressed to $OutPort_0$. It will be assumed that this is a new arbitration session (i.e., none of the packets is subject to an on-going arbitration session). Thus, the evaluators of the reservation ring are all initialized for the arbitration session by their state control logic. As a result of this initialization process, the evaluator for each of the input ports of the switching fabric has the address of the output port to which the HOQ packet at that particular input port is to be routed copied into its requested address register $RA_x$ and into its shifted address register $SA_x$. Additionally each evaluator loads its requested priority, $RP_x$, and shifted priority, $SP_x$, registers with the priority (equals Virtual Time Stamp) of the packet, and its Requested Reserved Bit, $RRB_x$, and Shifted Reserved Bit, $SRB_x$, with the traffic class of the packet. All of the input ports happen to be active during this arbitration session, so the InSession bit of each of the evaluators is set to a TRUE ("1") state. Furthermore, this is a new arbitration session, so each of the evaluators has its counter CNTR cleared and all of its contention related bits F, FC, RC and SC, as well as its contention vector bit T, reset to a FALSE ("0") state.

At step 0 of the arbitration process, each of the evaluators shifts the address stored in its shifted address register $SA_x$, its shifted contention flag bit SC, its shifted priority $SP_x$, and its shifted reserved bit, $SRB_x$, downwardly closed loop, round-robin order into the next lower evaluator of the reservation ring. This is a closed loop shift, so the shifted address, the shifted contention flag bit, the shifted priority and the shifted reserved bit of the lowermost evaluator (i.e., the evaluator for $InPort_3$) are shifted into the uppermost evaluator (i.e., the evaluator for $InPort_0$). At the same time, a TRUE ("1") contention vector bit is shifted into the uppermost evaluator, and the existing contention vector bits are shifted downwardly into the next lower neighboring evaluators in an open loop manner (i.e., the contention vector bit from the lowermost evaluator is dropped).

Following the shift operation, each of the evaluators compares the address in its requested address register $RA_x$ with the address in its shifted address register $SA_x$ for equality. If the evaluator determines that those two addresses are different, it takes no further action (see the states of the evaluators for $InPort_2$ & $InPort_3$). On the other hand, if an evaluator determines that its requested address and the address that has been shifted into it are the same, it concludes that the packet at its input port may be contending with a packet at another input port. The priority value and traffic type of produce multiple levels of contending packets. We compare $RP_x$ and $SP_x$ and $RRB_x$ and $SRB_x$ to determine if the shifted request is of a lower, higher or the same priority. If the priorities are the same then, to confirm that there is actual contention among those packets, the evaluator compares the states of its requested contention bit RC and shifted contention bit SC for equality. If those two bits have the same state (both FALSE ("0") or both TRUE("1")), the evaluator checks the state of its contention vector bit T to determine whether the contending packet is at an input port above or below the input port the evaluator is servicing. If the contender is at a lower input port (contention vector bit in a TRUE ("1") state), no immediate action is required of the evaluator. If, on the other hand, the evaluator concludes that the contender is at a higher input port (contention vector bit still in a FALSE ("0") state), the evaluator increments its counter CNTR to account for the fact that the contention has been resolved in favor of the contender.

This step and compare process is repeated at least N−1 times (where N is the number of input ports) for each arbitration cycle. If the counter CNTR of any of the evaluators overflows during any step of the process, the pending contention flag bit F for that evaluator in set to a TRUE ("1") state, thereby also setting the contention flag bit FC of the evaluator to a TRUE ("1") state.

If desired, an additional step operation may be performed to signal the conclusion of the arbitration cycle. Upon the conclusion of the arbitration cycle, the evaluators return TRUE ("1") grant signals to their respective input ports only if their pending contention bit F is still FALSE. Any input port that receives such a grant releases its HOQ packet into the switching fabric for routing to the designated output port. As will be seen, each of the evaluators also returns its pending contention bit F to its associated input port. Thus, if an input port concurrently receives a FALSE ("0") grant and a TRUE ("1") pending state bit, the input port holds its current HOQ packet for the next arbitration cycle.

The second and subsequent arbitration cycles of an arbitration session are similar to the first. That is, the requested addresses and the requested contention flag bits that are stored within the evaluators provide a two dimensional array of address and contention state data against which the address and state data that is provided by the circulating shifted addresses and shifted contention flag bits are compared for equality for every pairing of the input ports. However, whenever an additional arbitration cycle is required to complete an arbitration session, the contention flag bit FC is set to a TRUE ("1") state prior to the completion of the prior arbitration cycle in any evaluator that has its counter CNTR overflow (see FIG. 5E). This flag bit FC, in turn, is copied into the requested contention bit RC and the shifted contention bit SC of that evaluator during its initialization for the next arbitration cycle (see FIG. 9H), thereby ensuring that any unresolved contention continues to be resolved in a top-to-bottom, round-robin order during the subsequent cycle or cycles of the arbitration session.

An evaluator that finds equality to exist between its requested address and an address that is shifted into it resets its InSession bit to a FALSE ("0") state if it finds that the shifted address is accompanied by a TRUE ("1") shifted contention flag bit SC and that its own requested contention flag bit RC is false.

While the invention has been described with specific reference to an arbitration process for batcher/banyan ATM switching fabrics, it will be evident that it can be employed in arbiters for other types of ATM switching fabrics, such as those that have crossbar architectures. For some ATM switching applications, crossbar architected switch fabrics are preferred. See, for example, the ATM cross bar switch architecture described in copending and commonly assigned United States patent application Ser. No. 08/447,673 filed May 23, 1995, on "Device And Method For Use Of A Reservation Ring To Compute Crossbar Set-Up Parameters In An ATM Switch" (D/94467).

Even more generally, skilled artisans will recognize that many features of this invention are applicable to arbitrated distributed multiplexing for other types of packet switched networks, such as IP (Internet Protocol) networks and frame relay networks. Accordingly, it is appropriate to define an "arbitrated distributed multiplexing point" as being a system or subsystem (collectively referred to herein as a "system") which gives a plurality of inputs multiplexed access to one or more outputs under the control of an arbiter which, in turn, arbitrates among access requests that reside in a queue which is distributed across the inputs.

While exploring some of the alternative applications of the invention, it was realized that a modified form of the invention could be employed in systems having centrally arbitrated bidirectional and two-way, parallel unidirectional packet switched bus architectures (see, for example, the Cellbus architecture as described in *Electronic Engineering Times*, Oct. 2, 1995) to allocate the bus bandwidth in accordance with a weighted fair queuing and/or a virtual clock bandwidth allocation algorithm as described above. This observation applies to modest capacity ATM-access multiplexers, but it may have application to other bus architected systems and subsystems that support point-to-point and/or one-to-many communications between any of a plurality bus clients that are allocated different shares of the bus bandwidth.

Figure 9:
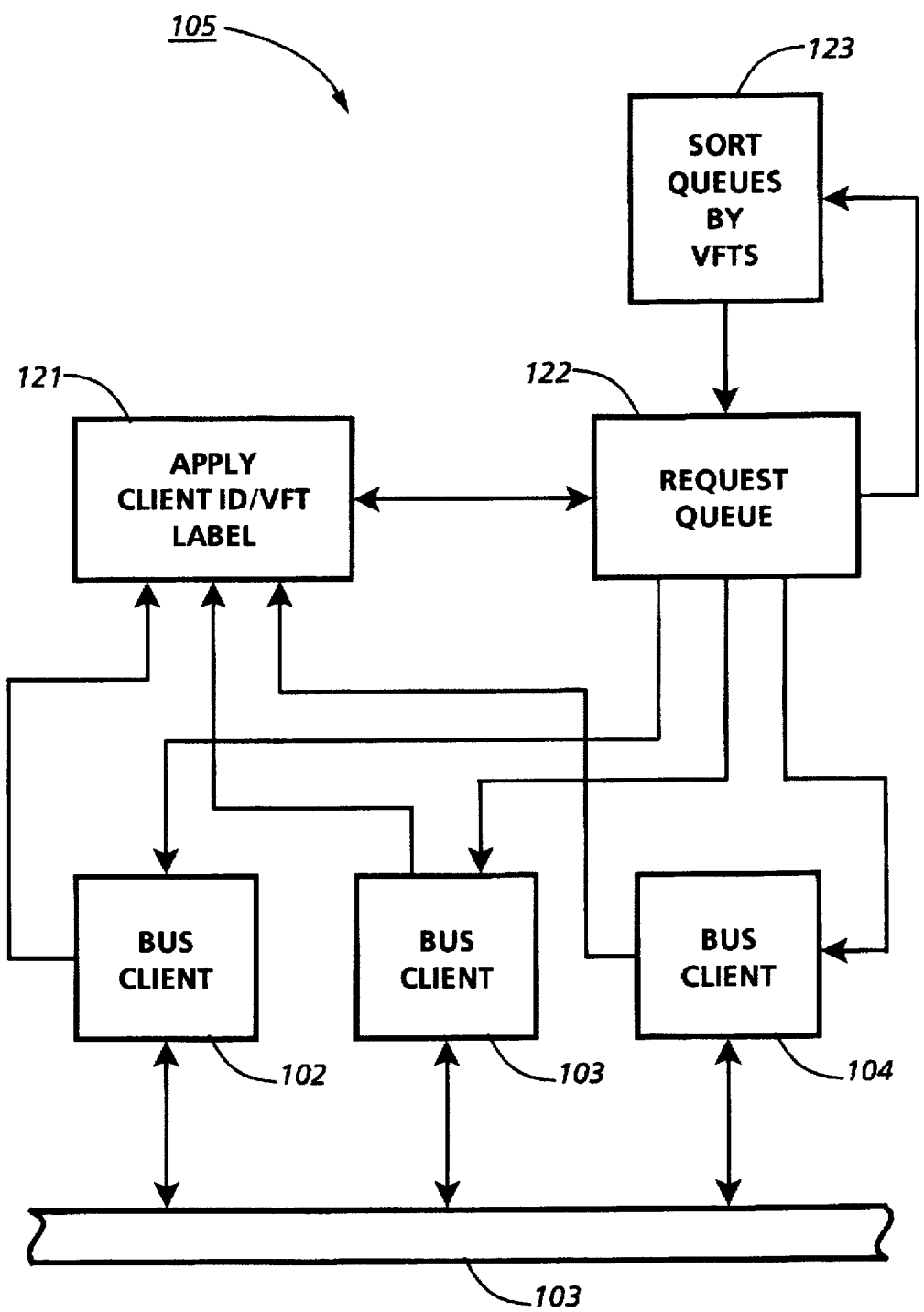
FIG. 9 illustrates a bus architected implementation of certain of the broader aspects of this invention.

Accordingly, as shown in FIG. 9, there is a packet switched bus 101 for packet communications between a plurality of bus clients 102–104 under the control of a central arbiter 105. The bus clients 102–104 are illustrated as being bidirectional communicating devices, but in some applications the bus 101 may also service unidirectional packet sources (not shown) that import packets to the bus and/or unidirectional packet sinks that export packets from the bus. Therefore, "input/output" terminology is employed to describe packet sources and packet sinks, without reference to whether a source is also capable of functioning as a sink, and vice-versa. As will be appreciated, the arbitration process runs on the inputs.

To carry out the arbitration process, the bus clients 102–104 are coupled to the arbiter 105 by request lines 111–113 and by grant lines 115–117, respectively. Packets are buffered in the clients 102–104 (by means not shown) pending arbitration. Thus, when a client loads a packet into its output buffer, the client registers an arbitration request with the arbiter 105 on behalf of this pending packet. This request identifies the pending packet, such as by transferring a unique packet id to the arbiter 105. The arbiter 105, in turn, identifies the client that is making the request, and then computes a virtual finishing time for the pending packet based on the current virtual time (VFT) and on the bandwidth share that is assigned to the client that is making the request (using either the weighted fair queueing or virtual clock algorithms that are described hereinabove). The arbiter 105 applies a label containing this client id and VFT to the request at 121, and then loads the labeled request into its request queue 122. This causes the request queue 122 to be resorted on the VFTs of the queued requests as at 123.

The arbiter 105 takes the request that is at the head or tail of its request queue 122 (depending on whether the requests are sorted in ascending or descending order of their VFTs) off the queue and returns a grant to the client identified by this request, thereby notifying that client that it has been granted access to the bus 101 for the next packet transport cycle. Suitably, for ATM communications and other applications involving the transfer of fixed length packets, conventional clock based timing is employed for synchronizing the bus clients 102–104 and the arbiter 105 with the bus 101.

When grant is returned to a bus client, the client extracts the packet id from the grant to identify the packet that has "won" arbitration. If necessary, the client moves that packet to the head of its pending queue in preparation for putting it on the bus 101 during the next packet transport cycle. This enables the clients 102–105 to support multiple classes of service since the clients may be allocated different shares of the bus bandwidth for different of service.

CONCLUSION

In view of the foregoing, it will be understood that the reservation ring mechanism of this invention effectively resolves output contention in a fair, round-robin order with minimal impact on the throughput of the switch. Individuals interested in a more in-depth discussion of unicast and multicast operation of the illustrated switch, trunk grouping of the inputs and outputs of the switch, and/or the disambiguation of packets that are simultaneously routed to the same output port of the switch in accordance with the k speed-up factor that is provided by the switch described U.S. patent application Ser. No. 08/104,458 (incorporated by reference above).

What is claimed:

1. In a finite bandwidth distributed multiplexing system which is configured to simultaneously route packets for a given class of service from up to k different inputs, where k≧1, to a given output in response to service requests made by a potentially larger number of inputs on behalf of packets at said inputs; each of said inputs being assigned a predetermined share of said bandwidth for feeding packets to said output and having at least one storage queue for said packets pending service grants: an improved process for resolving scheduling conflicts among said packets, said process comprising the steps of labeling each of the service requests made by said inputs upon their receipt (i) with an identifier which uniquely identifies the input making the request and (ii) with a virtual finishing time, said virtual finishing time being computed from a current virtual time by adding an offset that is weighted in accordance with the bandwidth share assigned to the input making the request;

entering the labeled service requests into a distributed queue;

sorting the labeled requests in said queue, each time a new request is entered into said queue, in accordance with their respective virtual finishing times to organize the labeled requests in ascending order of virtual finishing times; and taking up to the first k labeled requests off said queue for service during each cycle of said multiplexing system.

2. The process of claim 1 wherein said distributed queue is defined by a reservation ring which runs an arbitration process for resolving said scheduling conflicts; and the sorting of said labeled requests is performed by said arbitration process.

3. The process of claim 1 wherein said virtual finishing times are defined by binary values of constrained bit length.

4. The process of claim 3 wherein said virtual finishing times are expressed as relative times within a constrained range which is greater than twice the ratio of a largest one of the assigned bandwidth shares to a smallest one of the assigned bandwidth shares.

5. The process of claim 4 wherein said distributes queue is defined by a reservation ring which runs a cyclical arbitration process on said distributes queue for resolving said scheduling conflicts; and the sorting of said labeled requests is performed by said arbitration process.

6. The process of claim 5 wherein the virtual finishing time for determining said current virtual time is determined by monitoring said arbitration process.

7. The process of claim 6 wherein said current virtual time is determined based on the virtual finishing time of the request with the largest virtual finishing time of the requests taken off said distributed queue during a most recent arbitration cycle.

8. The process of any of claims 1, 2, 4, 5 or 7 wherein said packets have identical bit lengths.

9. The process of claim 8 wherein said multiplexing system includes a non-blocking asynchronous transfer mode switching fabric for distributing aid packets from said inputs to selected ones of a plurality of outputs.

10. The process of claim 9 wherein $k \geq 2$.

11. The process of any of claims 1, 2, 4, 5 or 7 wherein said system routes packets for a plurality of different service classes, including a reserved traffic class and a best efforts class;

said packets are first sorted into said service classes before said service request are made, class of service dependent operations are performed on service requests within said distributed queue to provide timely routing of reserved traffic class packets.

12. The process of claim 11 wherein, at least under certain conditions, said current virtual is determined, for any service request made on behalf of a reserved traffic class packet, based on a theoretical packet finishing time; where the theoretical finishing time for a given packet over a link having the bandwidth that is assigned to the input making the service request on behalf of the given packet.

13. The process of claim 12 wherein said multiplexing system includes a non-blocking asynchronous transfer mode switching fabric for distributing aid packets from said inputs to selected ones of a plurality of outputs.

* * * * *

UNITED STATES PATENT AND TRADEMARK OFFICE
CERTIFICATE OF CORRECTION

PATENT NO. : 5,689,508
APPLICATION NO. : 08/576099
DATED : November 18, 1997
INVENTOR(S) : J Bryan Lyles It is certified that error appears in the above-identified patent and that said Letters Patent is hereby corrected as shown below:

Column 1, line 4, insert as a new paragraph:

This invention was made with Government support under DABT63-92-C-0034 awarded by DARPA. The Government has certain rights in this invention.

Signed and Sealed this

Eighteenth Day of March, 2008

JON W. DUDAS
*Director of the United States Patent and Trademark Office*